(12) United States Patent
Lohan et al.

(10) Patent No.: US 9,494,133 B2
(45) Date of Patent: Nov. 15, 2016

(54) METHOD FOR LOWERING AND RAISING A WIND TURBINE BLADE

(71) Applicant: Inventus Holdings, LLC, Juno Beach, FL (US)

(72) Inventors: Martin E. Lohan, Palm City, FL (US); Henrik Pander, Tommerup (DK); Daniel M. Brake, Hobe Sound, FL (US)

(73) Assignee: INVENTUS HOLDINGS, LLC, Juno Beach, FL (US)

(*) Notice: Subject to any disclaimer, the term of this patent is extended or adjusted under 35 U.S.C. 154(b) by 203 days.

(21) Appl. No.: 14/296,934

(22) Filed: Jun. 5, 2014

(65) Prior Publication Data

US 2014/0360015 A1    Dec. 11, 2014

Related U.S. Application Data

(60) Provisional application No. 61/831,319, filed on Jun. 5, 2013.

(51) Int. Cl.
*B23P 15/04* (2006.01)
*B23P 6/00* (2006.01)
*F03D 1/06* (2006.01)
*F03D 1/00* (2006.01)
*B66C 23/20* (2006.01)

(52) U.S. Cl.
CPC ............ *F03D 1/0658* (2013.01); *B66C 23/207* (2013.01); *F03D 1/003* (2013.01); *F05B 2230/61* (2013.01); *F05B 2230/70* (2013.01); *Y02E 10/721* (2013.01); *Y02P 70/523* (2015.11); *Y10T 29/49318* (2015.01)

(58) Field of Classification Search
CPC .................. Y10T 29/49321; Y10T 29/49631; Y02P 70/523; F03D 1/0658; F03D 1/001; F03D 1/003; F03D 1/006; Y02E 10/721
See application file for complete search history.

(56) References Cited

U.S. PATENT DOCUMENTS

2010/0139062 A1* 6/2010 Reed ................. F03D 1/001 29/23.51
2010/0254813 A1* 10/2010 Dawson .............. B66C 23/207 416/146 R

FOREIGN PATENT DOCUMENTS

WO    WO 2011064659 A2 *  6/2011 ............. B66C 1/108

* cited by examiner

*Primary Examiner* — Jason L Vaughan
*Assistant Examiner* — Amanda Meneghini
(74) *Attorney, Agent, or Firm* — Cozen O'Connor

(57) ABSTRACT

A method of lowering a wind turbine blade after removal from a wind turbine lowers the blade in a vertical position to a point near the ground, and rotates it to a horizontal position for emplacement on a cradle. A winch is situated in the nacelle of the wind turbine. A cable extends downward from the winch to the blade root where it may be secured to a load cell. A tip end shoe is placed around the lower portion of the blade, and includes a crane hook receiving component that is used when the blade orientation is being changed. Tag lines are attached to the root and the tip end shoe, and extend to points on the ground where technicians manipulate them to prevent the blade from being blown into the tower.

18 Claims, 4 Drawing Sheets

METHOD FOR LOWERING AND RAISING A WIND TURBINE BLADE

CROSS-REFERENCE TO RELATED APPLICATION

This Non-provisional Utility application claims priority to U.S. Provisional Patent Application Ser. No. 61/831,319, filed on Jun. 5, 2013.

BACKGROUND

Wind turbines are rapidly becoming a significant source of electrical power throughout the United States and in the world. A typical wind turbine consists of an electrical generator mounted in a nacelle atop a tower that may be 60 or more meters tall. The generator is powered by wind which rotates turbine blades. The turbine blades, which may be up to 50 or more meters in length and weigh upwards of 1900 kg, are mounted to a hub at the forward end of the nacelle. Typically, three blades are used, and a gearbox converts the relatively slow turbine revolution rate to a faster rate of revolutions suitable for the generator.

As with most mechanical machinery, periodic maintenance, refurbishing or repair is needed for wind turbines, including the occasional need to repair or refurbish a blade of the wind turbine. When such refurbishing or repair cannot be administered upon the blade while attached to the hub, it is necessary to remove the blade from the wind turbine and lower it to the ground, where the necessary work may be performed. Upon completion of the work, the blade must be raised to the nacelle and reattached to the hub. The extreme length and weight of a blade, and its aerodynamic shape and structural characteristics, make the job of lowering and raising a blade from a turbine in the field a difficult and exacting task. In addition, blades must be removed from wind turbines situated in areas in which accessibility is limited, and in which the local terrain may not permit the ingress or egress of larger vehicles, such as large cranes. Moreover, because wind turbines are designed to be situated in areas of more-or-less constant prevailing winds, the winds have a tendency to interfere with the raising or lowering of a turbine blade, threatening to knock it against the adjacent tower or to cause the blade to twist and rotate during the lifting process.

Various systems have been developed for performing the task of raising and lowering wind turbine blades for maintenance, refurbishing, or repair. One of these systems is U.S. Pat. No. 7,726,941, Ser. No. 11/738,685 (Pub. No. US-2007-0266538) to Bervang, which describes a method for raising a turbine blade using a rigid yoke that grips the blade to be raised or lowered with a jaw-like structure. The yoke has an integral counterweight which assists in rotating the blade between vertical and horizontal positions, and is raised or lowered by a crane. Tag lines between the yoke and the crane are used to turn or otherwise position or manipulate the blade during raising or lowering. Although this system uses tag lines to prevent the blade from twisting or banging against the tower, its use of a crane hoisting a rigid yoke with a jaw-like structure places extreme pressure point stresses upon interior portions of the blade and requires a suitably smooth or flat area in the vicinity of the base of the tower to support a large crane.

U.S. Pat. No. 8,083,212 discloses a lifting system in which a lifting winch may be mounted in the rotor head, in the nacelle, or on the ground, and that lifts a turbine blade with a cable attached to the winch. A movable sheaf, or pulley, supports a hoisting cable from within the nacelle. A frame structure serves as a harness or yoke to grasp the blade at or near the root, and maintains it in a desired vertical or horizontal orientation as it is suspended from the cable. As the blade is lifted, the frame creates forces on the blade that cause the blade to assume a particular angle with reference to the vertical. Although the harness may be effective in controlling the vertical and horizontal orientation of the blade, this system does not have tag lines that would be necessary to prevent the wind from blowing the blade against the tower or to prevent it from twisting during the hoisting operation.

Canadian Patent CA 2,692,705 to Reed et al. discloses a system in which two winches mounted at ground level on either side of a wind turbine tower each operate a hoisting cable. Each cable extends upward to a pulley that is attached to the rotor hub, which then extends downward to a blade that is to be hoisted up to the hub. A pick crane assists the process by lifting the lower tip of the blade. The use of two cables, one at either side of the blade, provides some protection against the blade's becoming twisted in light winds during hoisting. However, without having taglines to brace the blade against twisting in higher winds, and to hold the blade away from the tower during such winds, this system is limited to being used only in no wind or light wind situations—which are the antithesis of optimal placement for a wind turbine farm.

SUMMARY OF THE INVENTION

The Blade Removal System of the invention overcomes these drawbacks. It is a system and method of lowering a wind turbine blade after it has been removed, and of raising the blade for reinstallation it after repairs have been completed. The system is intended to lower the blade from the hub in a vertical orientation to a point near the ground, and to rotate it to a horizontal position before placing it on a flatbed cradle for maintenance and repair. In an embodiment, the system will operate satisfactorily at temperatures ranging from −10 degrees F. to 120 degrees F., and will hoist blades weighing up to 1900 kg. which may include bearing assemblies of about 270 kg.

The system uses a winch that, in a preferred embodiment, is situated in the nacelle of the wind turbine. A cable extends downward from the winch to the blade root where it may be secured to a load cell. In alternative embodiments, a cable may be threaded through a pulley wheel attached to the root end of the blade, and will extend back to the nacelle where it is secured to a load cell. The slack cable on the other side of the winch is threaded through cable guide pulleys in the nacelle and, in an embodiment, extends to the ground immediately beneath the turbine blade hub. The winch lowers or raises the blade by means of a "lifting yoke," which is attached to safety cross beams at the root end of the blade. The winch raises or lowers the cable, thereby raising or lowering the blade. In an alternative embodiment, the cable extends through the pulley, and is secured to a load cell in the nacelle. In this alternative arrangement the torque needed to raise or lower the blade is only one-half the weight of the blade being hoisted.

In a preferred embodiment, the winch will have at least two speeds of operation, and the blade will be raised or lowered at 11 m/min. or at 22 m/min., depending upon the winch speed. An operator may select the winch operating speed by means of a controller having "fast" and "slow" speed selections for raising and lowering operations. A cable storage system in the form of a take-up spool may be located within the nacelle or on the ground, and will take up or release cable as necessary as the winch is operated. Take-up spool operation may be manually controlled, possibly using a foot pedal.

In operation, the blade to be removed is turned to the six o'clock position on the turbine hub. A tip end shoe is placed around the blade about 7 meters from the lower tip, and an optional tip sock may be placed at the very tip of the blade. The tip end shoe includes a crane hook receiving component that is used when the blade orientation is being changed. The tip end shoe and tip sock are held vertically in place with a cord that extends vertically upward to the blade root, where the cord is secured.

As the blade is disengaged from the hub, the lifting yoke is attached to the blade root. A cable from the winch runs to the lifting yoke where it is secured to a load cell mounted on the blade root. Tag lines are attached to the tip end shoe at the blade's leading and trailing edges, and extend to points at ground level where technicians hold them to prevent the blade from being blown by any wind that may be present. Two other tag lines are attached to eye bolts or some other suitable fastening mechanism at either side of the blade root, and also extend to the ground where the technicians can hold and manipulate them. The technicians are positioned some distance from the base of the tower, and are able to prevent the blade from blowing or twisting by appropriate manipulation of the tag lines. Without tag lines, the blade is subject to being blown against the tower or being twisted during the blade raising or lowering operation. The system is designed to permit safe operation in winds that may gust up to 12 m/sec.

As the blade is lowered in a vertical orientation and nears the cradle (on the ground), a small pick crane will control a line running from the crane to a crane hook attachment point on the tip end shoe. When this line is tightened, the blade will be rotated to a horizontal orientation, being suspended horizontally by the lifting yoke at one end, and the crane hook attachment at the other. From this position, the blade may be lowered directly onto a blade refitting cradle on a trailer bed for renovation.

As opposed to large cranes which are more expensive and less maneuverable, the pick crane is relatively small, is capable of traversing rough terrain that typically surrounds a wind turbine, and is needed only to lift the lower end of the blade when the blade is to be oriented horizontally while suspended near the ground. The four tag lines extend to the ground from points on either side of the blade, and are controlled by human workers who are able to secure and manipulate the tag lines from positions remote from the base of the tower that may be on uneven or severely sloping ground. After the blade has been repaired or renovated, it will be hoisted back to the hub of the wind turbine in the reverse order of the steps by which it was lowered.

In a preferred embodiment, the blade is raised and lowered by a winch that is located within the nacelle of the wind turbine. In other embodiments the winch may be situated on the ground near the base of the turbine tower. The take-up reel may also be situated in the nacelle or on the ground to take-up or release slack cable and prevent it from becoming tangled or coated with debris from the ground.

The weight of the blade is primarily borne by a lifting yoke that is attached to the blade root. Elsewhere along the blade, the blade is supported by a flexible harness that secures the lower end of the blade with a tip end shoe, which is a belt-type apparatus that wraps around the blade and that provides an attachment point for the lower tag lines and the pick crane cable. In an embodiment, the tip end shoe may also include a tip sock that fits around the extreme lower tip of the blade and that is attached to the tip end shoe by vertical suspenders. The harness may secured at the top (root) end of the blade by a collar that is fastened about the root end. Suspender cords extend down from the collar on either side of the blade to hold the tip end shoe.

It is an object of this invention to provide a method for raising and lowering a wind turbine blade without causing damage to the blade. More specifically, it is an object of the invention to provide a lifting system that allows the use of tag lines to keep a blade from being blown against the tower while being lifted or lowered.

It is an additional object of the invention to provide a lifting system that can safely be used in all terrains.

It is a further object of the invention to provide a lifting system in which inexpensive supporting equipment such as a pick crane or a flat horizontal cradle can be used.

It is another object of the invention to provide a lifting system in which lifting and lowering is provided by a single winch.

It is yet a further object of the invention to provide a lifting system in which tag lines may be manipulated by human personnel from locations in which machinery cannot be situated.

It is another object of the invention to provide a lifting system in which a blade is raised or lowered in a vertical orientation when it is above the ground by a distance greater than its length, and which will be rotated to a horizontal position when it is below that height.

These and other objects of the invention will become evident from the following description of the preferred embodiments.

DETAILED DESCRIPTION OF THE PREFERRED EMBODIMENTS

Figure 1:
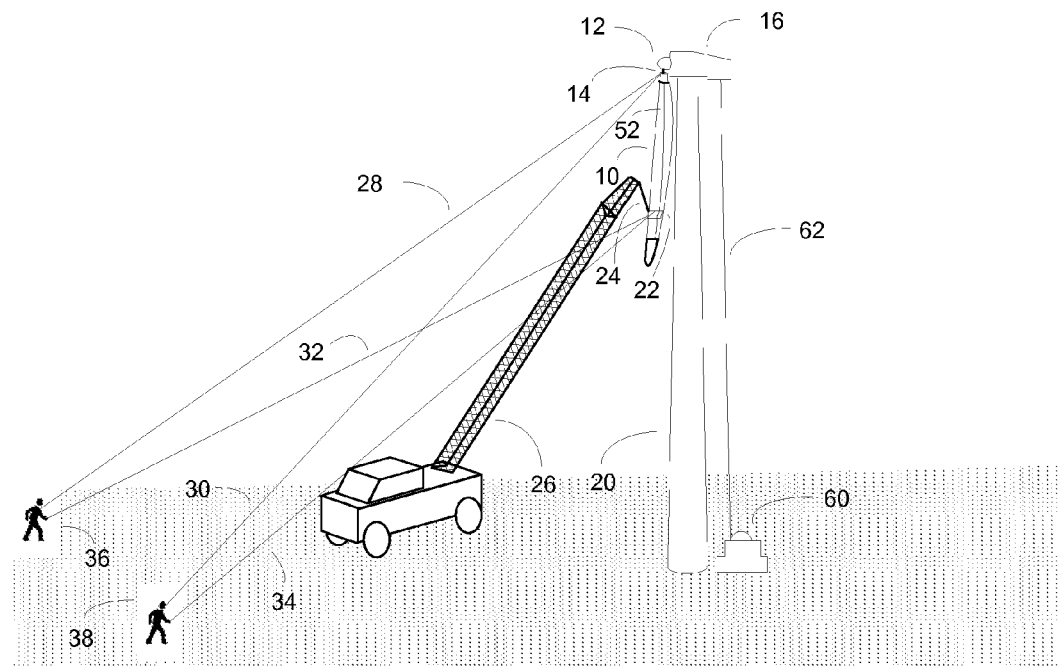
FIG. 1 depicts the system in preparation to lower a blade that has been removed from a wind turbine.

Referring to FIG. 1, a blade 10 has been detached from a hub 12 and is being supported by main cable 14 which extends downward from a nacelle 16 at the top of tower 20. Cable 14 is attached to a traction hoist or winch which, in a preferred embodiment, is situated in nacelle 16. Slack main cable 62 has no tension on it, and feeds down from wind turbine tower 20 where it is taken up by take-up spool 60. In other embodiments the take-up spool may also be located in the nacelle, or the winch may be situated at ground level rather than within nacelle 16. To hold the blade and lower it from the hub, the winch is used to provide the hoisting power.

A tip end shoe 22 fits around the lower section of the blade, and is held in place with a suspender cord 52 that extends longitudinally along the blade between the tip end shoe 22 and a collar 54. The tip end shoe forms the lower part of a harness that holds the blade at a desired orientation. In a preferred embodiment, with a blade of approximately 23-24 meters in length, the tip end shoe is located approximately 5-7 meters from the end of the blade. A cable 24 which is controlled by a pick crane 26 is secured to the tip end shoe, and is used to support the blade against any wind that would cause the blade to knock against the turbine tower 20, and to rotate the blade to a horizontal position before the blade is set down.

Four tag lines are attached to the blade and are manually controlled by personnel on the ground. Upper tag lines 28, 30 are attached to the upper (root) end of the blade on either side of the blade. One tag line 28 extends to a first person 36 situated to one side of the tower 20 and pick crane 26, while the other tag line 30 extends to a second person 38 situated on another side of the tower and pick crane. The positioning of the individuals controlling the tag lines will be based upon the prevailing winds and the location of the pick crane. In a preferred embodiment, the tag line holders will be situated downwind of the tower with the wind direction tending to blow the blade away from the tower and in a direction midway between the two individuals.

Lower tag lines 32, 34 are attached at either side of the blade at the tip end shoe near the lower end. A pick crane cable 24 is also secured to the tip end shoe. As the blade is being raised or lowered, individuals 36, 38 manually hold the upper and lower tag lines to prevent the blade from twisting in the wind and to hold it away from the turbine tower if the wind should be blowing in that direction. As the blade is lowered, as shown in FIG. 2, a flatbed cradle 40 will be situated to receive the blade in a horizontal orientation.

Figure 2:
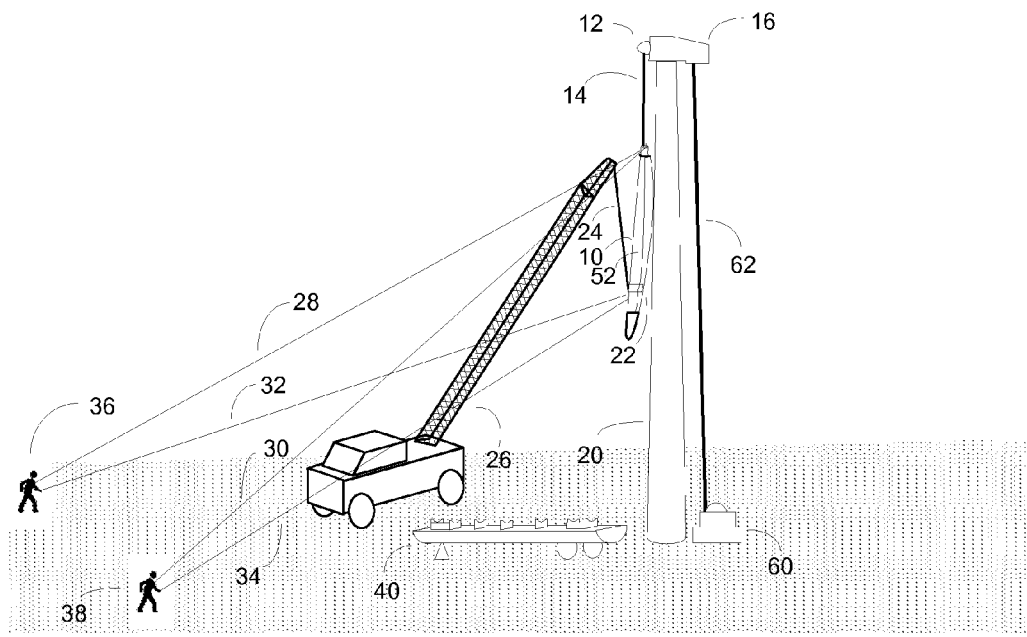
FIG. 2 depicts the system of FIG. 1 when the blade has been lowered a distance from the blade hub.

FIG. 2 shows the hoisting system with a turbine blade 10 having been lowered midway from the turbine hub 12 to the ground. Pick crane 26 has released some of cable 24 to permit the blade to be lowered in a substantially vertical orientation. Upper tag lines 28, 30 maintain the root end of blade 10 in a desired position away from turbine tower 20 and free from twisting. Lower tag lines 32, 34 similarly hold the lower end of blade 10 at tip end shoe 22, keeping the blade away from turbine tower 20 and preventing the blade from being twisted by the wind. The winch in the nacelle has lowered cable 14, thereby permitting the blade to be lowered from the nacelle 16. Slack main cable 62 is being released from take-up spool 60, and feeds into the winch to permit continual lowering of the blade 10. Equipment for receiving the lowered blade is depicted in the form of a flatbed cradle 40 although any suitable cradle for receiving a blade may be used. In some embodiments, when a blade is to be modified, the receiving cradle may also include machining apparatus designed to perform any intended modification or refurbishing of the blade.

Figure 3:
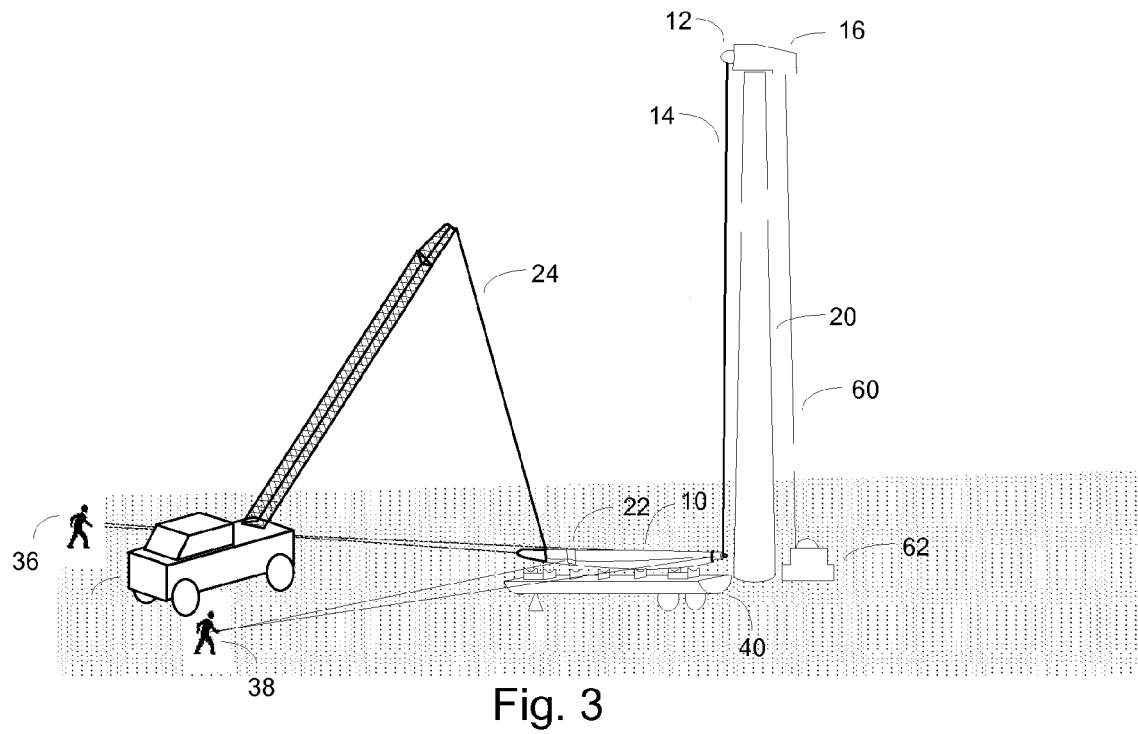
FIG. 3 depicts the system of FIG. 1 when the blade has been rotated horizontally and lowered to a cradle which will hold the blade during repair.

In FIG. 3, the blade 10 has been lowered and reoriented to a horizontal position preparatory to being received in a flatbed cradle 40. Main cable 14 has been fully extended, and pick crane cable 24 is also near its full extension. Human tag line controllers 36, 38 are able to manipulate the root end and opposing end of blade 10 to align blade 10 with the receiving cradle 40. Once the blade has been seated on its cradle, all lines and cables may be removed, and repair or refurbishing may then be done in situ.

Figure 4A:
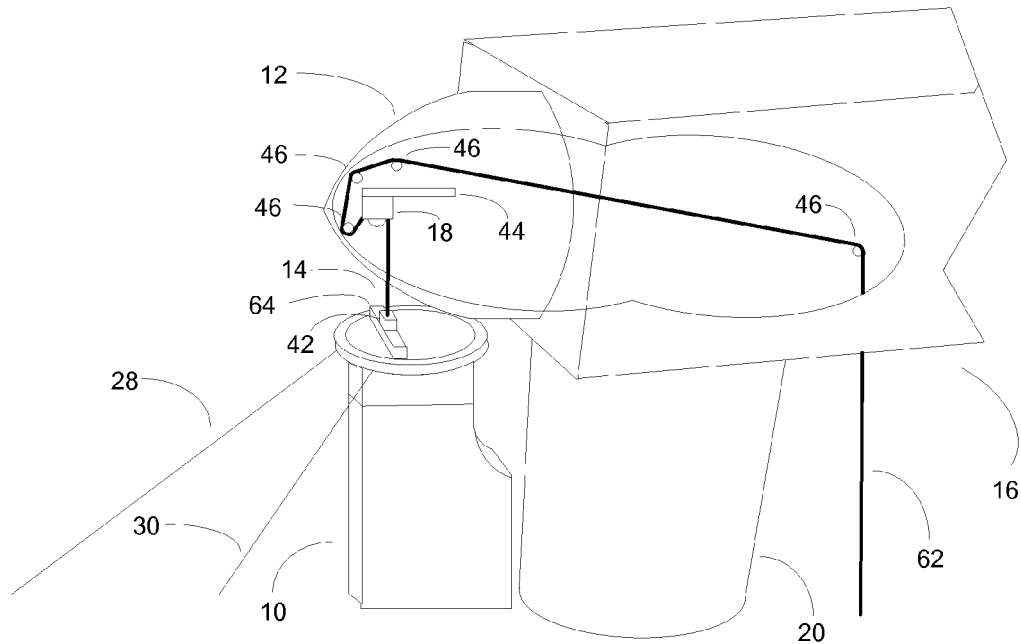
FIG. 4a shows an interior view of a preferred embodiment of the system of the invention.
Figure 4B:
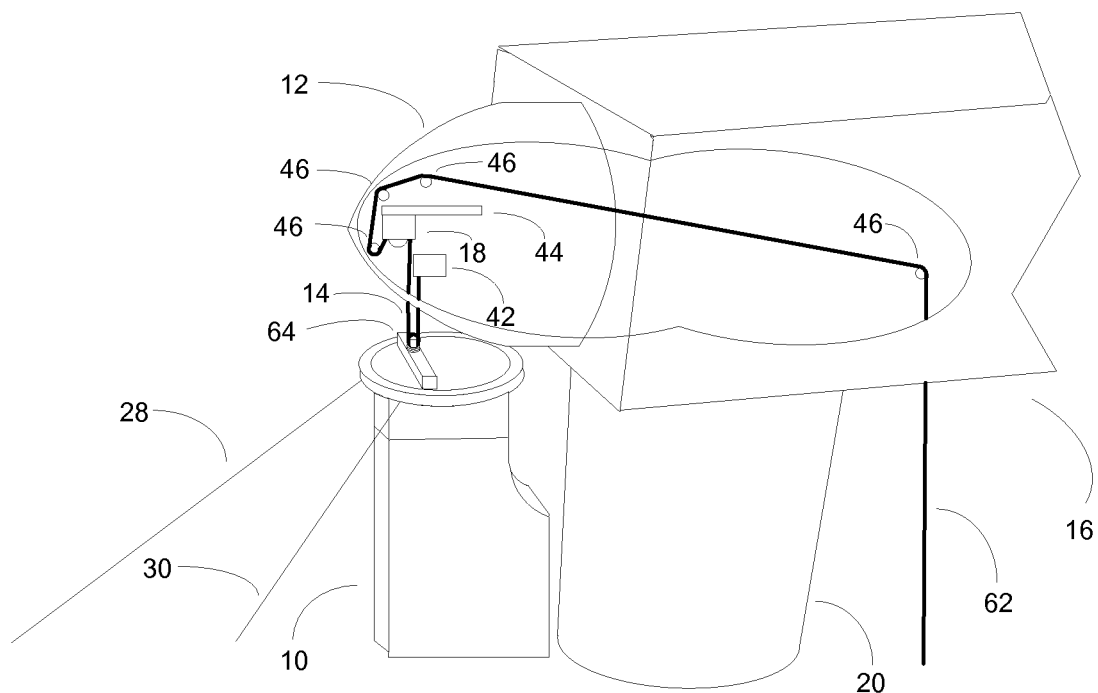
FIG. 4b shows an interior view of an alternative embodiment of the system of the invention.
Figure 4C:
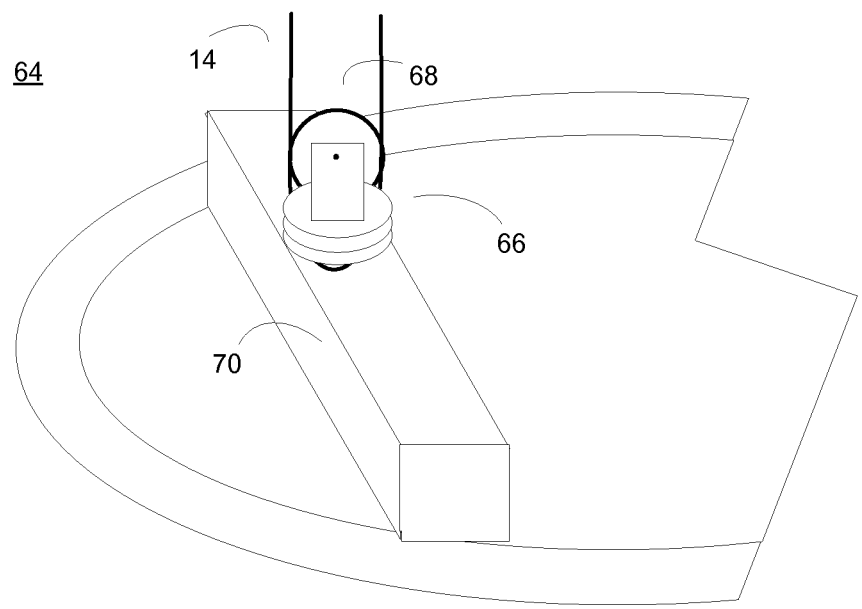
FIG. 4c depicts detail of a portion of what is shown in FIG. 4.

FIG. 4*a* is a depiction of the hoisting components in the nacelle 16, and of the main cable and its attachment to the root of the blade being hoisted. In the preferred embodiment, a winch 18 is situated in the nacelle 16, and is supported by supporting structure 44 that is sufficient to hold the weight of the blade via a single main cable 14. FIGS. 4*b* and 4*c* depict an alternative embodiment in which a lifting yoke 64 is attached to the root end of blade 10, and comprises a pulley arrangement in which a pulley 68 is attached to a swivel 66 that may turn through an arc of 360 degrees. The swivel, in turn, is attached to a supporting arm 70 that extends across the blade root and is firmly secured to the blade root.

As shown in FIGS. 4*b* and 4*c*, the lifting yoke 64 permits the blade to be hoisted or lowered while winch 18 bears only one-half of the total weight of the blade. Load cell 42 bears the other half of the weight, and provides a method for recording the weight at each moment during the raising or lowering process. In the event of an abrupt change in weight, the winch may be automatically shut down to avoid damage to the blade while the cause of the weight change is investigated. A series of idler wheels comprise a cable guide structure 46 which guide the slack main cable 62 from the winch to a take-up reel (not shown) at the base of the tower 20. The cable 14 is in tension between load cell 42 and winch 18, and extends downwardly from winch 18 to the lifting yoke 64 located at the root of the blade 10.

Figure 5:
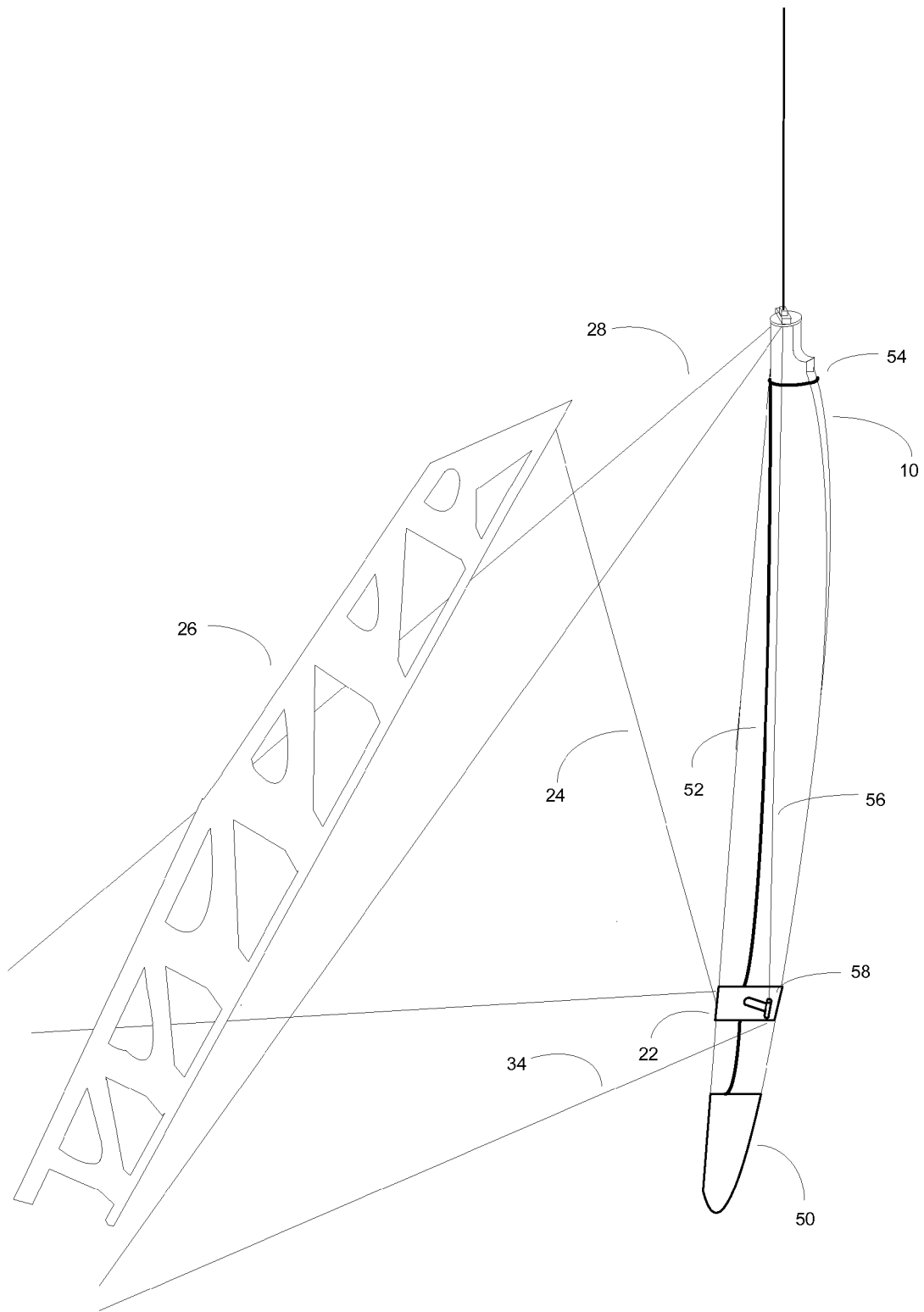
FIG. 5 shows the attachment of lower tag lines and a pick crane supporting cable to the lower end of a blade being hoisted.

FIG. 5 depicts detail in the harness used to stabilize the blade during raising or lowering. A collar 54 extends around the blade 10 near the root, and supports suspender cords 52 that run down the blade on either side to support tip end shoe 22. In embodiments in which a tip sock 50 is used, suspender cords 52 extend to the tip sock and hold it in place at the lower tip of the blade. A tag line support 58 may be attached at either side of tip end shoe 22, and may comprise a hollow ring through which tag lines 32, 34 pass. As shown, tag line 34 passes through tag line support 58 and extends upward 56 to the root end of the blade. In an embodiment, tag line 34 forms a continuous line through tag line support 58, turns upward 56 and passes through an eye bolt (not shown) at the root end of the blade, where it then continues back down to its human controller as tag line 30. In this embodiment, only two continuous tag lines are required, and are "strung" through tag line supports as indicated. Also shown in FIG. 5 is pick crane 26 with its cable 24 extending to tip end shoe 22 where it may be secured with a cable attachment (not shown). In an alternative embodiment, pick crane cable 24 may extend to tip sock 50 where it may be attached at the extreme end of blade 10.

In another embodiment, if greater control and stability are desired, a third set of tag lines may be utilized, and would attached to the blade harness at tip sock 50. Alternatively, lower tag lines 32, 34 may be attached at tip sock 50 rather than at tip end shoe 22. Varying circumstances of terrain, wind conditions, and blade size may dictate one or another of the possible configurations for tag line and pick crane cable attachments.

The foregoing description of possible embodiments consistent with the present invention does not represent a comprehensive list of all such embodiments or all variations of the embodiments described. The description of only some embodiments should not be construed as an intent to exclude other embodiments. Artisans will understand how to implement the invention in many other ways, using equivalents and alternatives that do not depart from the scope of the invention.

We claim:

1. A method of lowering a blade from a wind turbine comprising the steps of:

removing a blade from a wind turbine supported upon a tower;

affixing a lifting yoke to the root end of said blade;

attaching a hoisting cable to said lifting yoke and providing support for said hoisting cable from a position above said lifting yoke;

attaching a tip end shoe to a portion of said blade between the tip and the midpoint of said blade, said tip end shoe including a crane hook receiving component;

securing said tip end shoe in position along said blade with a cord attached to said tip end shoe and extending to and attached in proximity to said root end;

threading a left tag line through a first tag line support structure attached to said tip end shoe and a second tag line support structure attached to said cord in proximity to said root end such that said left tag line is capable of exerting a force at both said tip and said root end of said blade;

threading a right tag line through the first tag line support structure and the second tag line support structure such that said right tag line is capable of exerting a force at both said tip and said root end of said blade;

attaching a crane cable from a crane to said crane hook receiving component;

attaching said hoisting cable to a winch such that operation of the winch in a first direction releases hoisting cable toward said lifting yoke and operation of the winch in a second direction draws hoisting cable from the direction of said lifting yoke;

operating said winch in said first direction whereby said lifting yoke and said blade are lowered toward the ground;

manipulating said tag lines as necessary to prevent said blade from striking said tower;

tightening said crane cable from a point above said tip end shoe to impart a rotation of said blade to a substantially horizontal position;

lowering said blade using said hoisting cable and said crane cable to support the weight of said blade while manipulating said tag lines to orient said blade to a desired position for emplacement on the ground or on a receiving platform.

2. The method claimed in claim 1 further comprising the steps of attaching a tip sock to the tip end of said blade and attaching said cord to said tip sock whereby said cord holds said tip end shoe and said tip sock from sliding longitudinally along said blade during the lowering of said blade.

3. The method claimed in claim 1 wherein said winch is situated in a nacelle and said blade is lowered from said nacelle.

4. The method claimed in claim 3 further comprising providing a take-up spool whereby the portion of said hoisting cable that is not between said winch and said lifting yoke may be stored on said take-up spool and released as necessary to provide additional lengths of said hoisting cable to said winch.

5. The method claimed in claim 4 further comprising situating said take-up spool near the base of said tower.

6. The method claimed in claim 3 further comprising attaching a pulley to said lifting yoke whereby the attachment of said hoisting cable to said yoke further comprises extending said hoisting cable through said pulley and attaching the end of said hoisting cable to said nacelle.

7. The method claimed in claim 1 wherein said winch is situated on the ground and said hoisting cable extends to a nacelle housing of said wind turbine and is threaded through cable guide pulleys located in said nacelle.

8. The method claimed in claim 1 whereby said crane cable is attached to and manipulated by a pick crane the upper end of which is situated above said tip end shoe.

9. The method claimed in claim 1 whereby manipulation of said tag lines is done by individuals standing on the ground at a distance from the base of said tower.

10. A method of raising a blade to a wind turbine supported upon a tower comprising the steps of:

placing a blade in a horizontal position below a tower supporting a wind turbine;

affixing a lifting yoke to the root end of said blade;

attaching a hoisting cable to said lifting yoke and providing support for said cable from a position in the nacelle of said wind turbine;

attaching a tip end shoe to a portion of said blade between the tip and the midpoint of said blade, said tip end shoe including a crane hook receiving component;

securing said tip end shoe in position along said blade with a cord attached to said tip end shoe and extending to and attached in proximity to said blade root;

threading a left tag line through a first tag line support structure attached to said tip end shoe and a second tag line support structure attached to said cord in proximity to said root end such that said left tag line is capable of exerting a force at both said tip and said root end of said blade;

threading a right tag line through the first tag line support structure and the second tag line support structure such that said right tag line is capable of exerting a force at both said tip and said root end of said blade;

attaching a crane cable from a crane to said crane hook receiving component;

attaching said hoisting cable to a winch such that operation of the winch in a first direction releases hoisting cable toward said lifting yoke and operation of the winch in a second direction draws hoisting cable from the direction of said lifting yoke;

operating said winch in said second direction and operating said crane cable whereby said blade is raised in a substantially horizontal position;

manipulating said tag lines as necessary to prevent said blade from striking said tower;

when said blade is high enough above the ground to clear the ground in a vertical position, loosening said crane cable to impart a rotation of said blade to a substantially vertical position;

raising said blade using said hoisting cable and said crane cable to support the weight of said blade while manipulating said tag lines to orient said blade to a desired position for attachment to said wind turbine.

11. The method claimed in claim 10 further comprising the steps of attaching a tip sock to the tip end of said blade and attaching said cord to said tip sock whereby said cord holds said tip end shoe and said tip sock from sliding longitudinally along said blade during the raising of said blade.

12. The method claimed in claim 10 wherein said winch is situated in a nacelle and said blade is raised from said nacelle.

13. The method claimed in claim 12 further comprising providing a take-up spool whereby the portion of said hoisting cable that is not between said winch and said lifting yoke may be wrapped on said take-up spool and taken up as necessary to take up excess lengths of said hoisting cable from said winch.

14. The method claimed in claim 13 further comprising situating said take-up spool near the base of said tower.

15. The method claimed in claim 12 further comprising attaching a pulley to said lifting yoke whereby the attachment of said hoisting cable to said yoke further comprises extending said hoisting cable through said pulley and attaching the end of said hoisting cable to said nacelle.

16. The method claimed in claim 10 wherein said winch is situated on the ground and said hoisting cable extends to a nacelle housing of said wind turbine and is threaded through cable guide pulleys located in said nacelle.

17. The method claimed in claim 10 whereby said crane cable is attached to and manipulated by a pick crane the upper end of which is suspended above said tip end shoe.

18. The method claimed in claim 10 whereby manipulation of said tag lines is done by individuals standing on the ground at a distance from the base of said tower.

* * * * *